US006774556B2

(12) United States Patent
Srivastava et al.

(10) Patent No.: US 6,774,556 B2
(45) Date of Patent: Aug. 10, 2004

(54) DEVICE WITH MN$^{2+}$ ACTIVATED GREEN EMITTING SRAL$_{12}$O$_{19}$ LUMINESCENT MATERIAL

(76) Inventors: Alok Mani Srivastava, 1378 Philomena Dr., Niskayuna, NY (US) 12309; Holly Ann Comanzo, 2506 Eastern Pkwy., Niskayuna, NY (US) 12309; Douglas Allen Doughty, 48 Worthley Hill Rd., Goffstown, NH (US) 03045; William Winder Beers, 11481 Chapin St., Chesterland, OH (US) 44026

(*) Notice: Subject to any disclaimer, the term of this patent is extended or adjusted under 35 U.S.C. 154(b) by 627 days.

(21) Appl. No.: 09/746,349

(22) Filed: Dec. 26, 2000

(65) Prior Publication Data

US 2001/0019241 A1 Sep. 6, 2001

Related U.S. Application Data

(62) Division of application No. 09/359,900, filed on Jul. 26, 1999, now Pat. No. 6,210,605.

(51) Int. Cl.$^7$ .................................................. H01J 1/63
(52) U.S. Cl. ....................... 313/486; 313/487; 313/467; 313/496; 313/503
(58) Field of Search ................................. 313/485, 486, 313/487, 496, 582, 584, 503; 252/301.4 R, 103.4 R

(56) References Cited

U.S. PATENT DOCUMENTS

| 3,836,477 A | * | 9/1974 | Lagos ................. 252/301.4 R |
| 5,571,451 A | | 11/1996 | Srivastava et al. ..... 252/301.4 R |
| 5,624,602 A | * | 4/1997 | Lenox et al. ............... 313/486 |
| 6,210,605 B1 | * | 4/2001 | Srivastava et al. ..... 252/301.4 R |

FOREIGN PATENT DOCUMENTS

| FR | 2.205.736 | * 10/1973 | ............. H01J/1/63 |
| GB | 1384683 | * 10/1973 | ........... C09K/11/46 |

OTHER PUBLICATIONS

K.H. Butler "Fluorescent Lamp Phosphors, Technology & Theory" (Penn. State U. Press 1980) pp. 98–107. (No Month).

* cited by examiner

Primary Examiner—Michael H. Day

(57) ABSTRACT

A SrAl$_{12}$O$_{19}$ green luminescent material is doped with Mn$^{2+}$ activator ions and at least one trivalent rare earth sensitizer ion species. Preferably, the material contains four rare earth ions: Ce$^{3+}$, Pr$^{3+}$, Gd$^{3+}$ and Tb$^{3+}$. Optionally, a portion of the aluminum may be substituted with magnesium. The material may be used as a display device or lamp phosphor or as an X-ray diagnostic or laser scintillator.

28 Claims, 8 Drawing Sheets

DEVICE WITH MN$^{2+}$ ACTIVATED GREEN EMITTING SRAL$_{12}$O$_{19}$ LUMINESCENT MATERIAL

This application is a division of application Ser. No. 09/359,900, filed Jul. 26, 1999 now U.S. Pat. No. 6,210,605.

FIELD OF THE INVENTION

The present invention is directed to a luminescent material doped with various ions, and more particularly to a SrAl$_{12}$O$_{19}$ material doped with Mn$^{2+}$ Ce$^{3+}$, Pr$^{3+}$, Gd$^{3+}$, Tb$^{3+}$ and/or Mg$^{2+}$ and used as a lamp phosphor, a display phosphor or as a laser crystal.

BACKGROUND OF THE INVENTION

A luminescent material absorbs energy in one portion of the electromagnetic spectrum and emits energy in another portion of the electromagnetic spectrum. A luminescent material in powder form is commonly called a phosphor, while a luminescent material in the form of a transparent solid body is commonly called a scintillator.

Most useful phosphors and scintillators emit radiation in the visible portion of the spectrum in response to the absorption of radiation which is outside the visible portion of the spectrum. Thus, the phosphor performs the function of converting electromagnetic radiation to which the human eye is not sensitive into electromagnetic radiation to which the human eye is sensitive. Most phosphors are responsive to more energetic portions of the electromagnetic spectrum than the visible portion of the spectrum. Thus, there are phosphors and scintillators which are responsive to ultraviolet light (as in fluorescent lamps), electrons (as in cathode ray tubes) and x-rays (as in radiography).

Two broad classes of luminescent materials are recognized. These are self-activated luminescent materials and impurity-activated luminescent materials.

A self-activated luminescent material is one in which the pure crystalline host material upon absorption of a high energy photon elevates electrons to an excited state from which they return to a lower energy state by emitting a photon. Self-activated luminescent materials normally have a broad spectrum emission pattern because of the relatively wide range of energies which the electron may have in either the excited or the lower energy states. Thus, any given excited electron may emit a fairly wide range of energy during its transition from its excited to its lower energy state, depending on the particular energies it has before and after its emissive transition.

An impurity activated luminescent material is normally one in which a non-luminescent host material has been modified by inclusion of an activator species which is present in the host material in a relatively low concentration, such as in the range from about 200 parts per million to 1,000 parts per million. However, some materials require several mole or atomic percent of activator ions for optimized light output. With an impurity activated luminescent material, the activator ions may directly absorb the incident photons or the lattice may absorb the incident photons and transfer the absorbed photon energy to the activator ions.

The photon absorbed by the lattice may create mobile migrating electrons and holes in the lattice. Due to favorable charge configurations, the migrating electrons and holes are trapped at the activator ions, where they recombine and emit a photon of luminescent light.

Alternatively, if the photon is absorbed directly by the activator ion, the photon raises one or more electrons of the activator ion to a more excited state. These electrons, in returning to their less excited state, emit a photon of luminescent light.

In many commonly employed impurity activated luminescent materials, the electrons which emit the luminescent light are d or f shell electrons whose energy levels may be significantly affected or relatively unaffected, respectively, by the surrounding crystal field. In those situations where the activator ion is riot much affected by the local crystal field, the emitted luminescent light is substantially characteristic of the activator ions rather than the host material and the luminescent spectrum comprises one or more relatively narrow emission peaks. This contrasts with a self-activated luminescent materials much broader emission spectrum.

When a host lattice absorbs the incident photon (i.e. the excitation energy) and transfers it to the activator ion, the host lattice acts as a sensitizer. The host lattice may also be doped with sensitizer atoms. The sensitizer atoms absorb the incident photon either directly, or from the host lattice, and transfer it to the activator ion.

One prior art green light emitting phosphor is Zn$_2$SiO$_4$:Mn$^{2+}$. This phosphor is used in display devices, such as plasma displays and cathode ray tubes (CRT), and in various fluorescent lamps. The phosphor absorbs the emitted UV radiation from the lamp or plasma display or electrons in a CRT and emits radiation in the green spectral range.

It is generally advantageous for a phosphor to be resistant to radiation damage and exhibit a high lumen maintenance. Radiation damage is the characteristic of a luminescent material in which the quantity of light emitted by the luminescent material in response to a given intensity of stimulating radiation decreases after the material has been exposed to a high radiation dose. Lumen maintenance is the ability of a luminescent material to resist radiation damage ever time. Luminescent materials with a high resistance to radiation damage over time have a high lumen maintenance.

However, the Zn$_2$SiO$_4$:Mn$^{2+}$ phosphor has shown a significant decrease in light output after several hundred hours of bombardment by energetic UV radiation or electrons. Therefore, the phosphor suffers from poor lumen maintenance.

Two of the current inventors recently proposed a new Sr$_{1-x}$Pr$_x$Al$_{12-y}$Mg$_y$O$_{19}$ phosphor in U.S. Pat. No. 5,571,451. This phosphor emits light in the blue spectral range due to emission from the Pr$^{3+}$ activator. Furthermore, this phosphor exhibits a high quantum efficiency in the blue spectral range due to a Pr quantum splitting effect. However, this phosphor does not exhibit luminescence in the green spectral range.

In view of the foregoing, it would be desirable to provide a green emitting phosphor or scintillator material that exhibits an adequate lumen maintenance. It would also be desirable to provide a method of making such A phosphor or scintillator.

BRIEF SUMMARY OF THE INVENTION

One embodiment of the present invention provides a composition of matter, comprising AD$_{12}$O$_{19}$:Mn,R where A comprises at least one of strontium, barium and calcium, D comprises at least one of aluminum, gallium, boron and magnesium and R comprises at least one trivalent rare earth ion.

Another embodiment of the present invention provides a luminescent device, comprising a housing, a source of energetic media contained in the housing and a luminescent material contained in the interior of the housing. The luminescent material comprises $AD_{12}O_{19}$:Mn,R where A comprises at least one of strontium, barium and calcium, D comprises at least one of aluminum, gallium, boron and magnesium and R comprises at least one trivalent rare earth ion.

Furthermore, an embodiment of the present invention provides a method of making a phosphor, comprising the steps of mixing oxide, carbonate, hydroxide, nitrate or oxalate compounds of strontium, aluminum, manganese and at least one of gallium, magnesium, boron, calcium, barium, cerium, praseodymium, gadolinium and terbium, and heating a resulting mixture to form the phosphor. An embodiment of the present invention also provides a method of making a scintillator, comprising the steps of placing a single crystal seed in contact with a melt comprising strontium, aluminum, oxygen, manganese and at least one of gallium, magnesium, boron, calcium, barium, cerium, praseodymium, gadolinium and terbium, moving the seed from a high temperature zone to a low temperature zone and forming a single crystal scintillator in contact with the seed.

DETAILED DESCRIPTION OF THE INVENTION

The present inventors have discovered that $SrAl_{12}O_{19}$ is a luminescent material in the green spectral range when it is doped with $Mn^{2+}$ activator ions. Furthermore, trivalent rare earth ions, such as Ce, Pr, Gd and Tb act as sensitizers in $SrAl_{12}O_{19}$:$Mn^{2+}$. This material has a more saturated green luminescence (i.e., a sharp emission peak with a maximum wavelength in the green spectral region) and an equivalent absolute quantum efficiency compared to the prior art $Zn_2SiO_4$:$Mn^{2+}$ phosphor, having a broad emission peak in the green-yellow spectral range. The $SrAl_{12}O_{19}$:$Mn^{2+}$ phosphor is also superior to the $Zn_2SiO_4$:$Mn^{2+}$ phosphor with respect to high energy radiation damage resistance and lumen maintenance because of an inherent stability of its magnetoplumbite lattice structure.

While the present inventors do not wish to be bound by any particular theory as to why Mn and trivalent rare earth ion doping produces green emission from the $SrAl_{12}O_{19}$, the present inventors believe the following.

Figure 1:
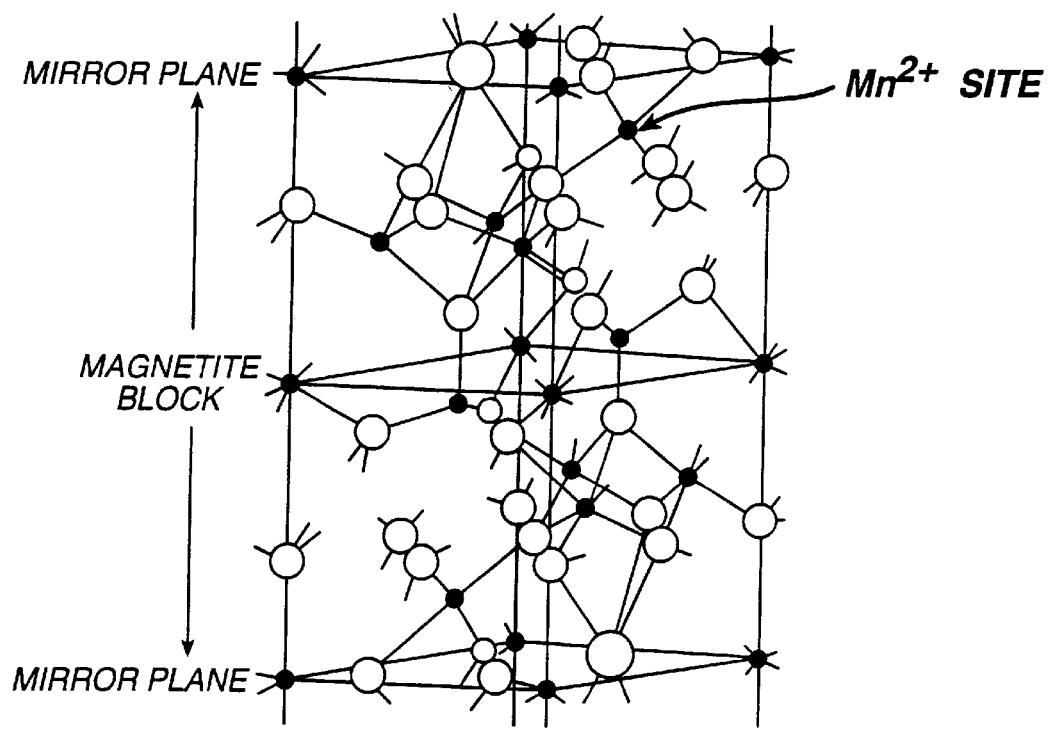
FIG. 1 is a perspective view of a magnetoplumbite crystal structure.

The $SrAl_{12}O_{19}$ material crystallizes in a magnetoplumbite structure, as shown in FIG. 1. The $Mn^{2+}$ dopant ions substitute Al ions on the Al tetrahedral cation sites not occupying the mirror plane. Therefore, the Mn ions have a tetrahedral coordination because each Mn ion has four bonds. Tetrahedrally coordinated $Mn^{2+}$ ions are subject to a weak crystal field. Therefore, $SrAl_{12}O_{19}$:$Mn^{2+}$ emits radiation in the green spectral range because the emitted luminescent light is substantially characteristic of the $Mn^{2+}$ activator ions rather than of the host material.

The strontium ions occupy cation sites inside the magnetoplumbite lattice mirror plane. Therefore, these ions expand the lattice mirror plane and are a source of crystal field effects in the lattice. The trivalent rare earth dopant ions occupy the Sr lattice sites. Since the rare earth ions are larger than the Sr ions, the rare earth ions may cause a greater amount of mirror plane expansion than the Sr ions and act as sensitizers for the $Mn^{2+}$ activator ions.

The preferred trivalent rare earth ions are cerium (Ce), praseodymium (Pr), gadolinium (Gd) and terbium (Tb). However, other trivalent rare earth ions may be used. The present inventors believe that each rare earth ion has a different sensitizer function. Pr acts as a sensitizer for 185 nm incident radiation. Therefore, if the luminescent material is exposed to 185 nm radiation, the Pr ions on the Sr lattice sites absorb the incident radiation and transfer the energy generated by the incident radiation to the $Mn^{2+}$ activator ions on the Al sites. Therefore, if $SrAl_{12}O_{19}$:$Mn^{2+}$ is used as a green emitting phosphor for a UV gas discharge lamp that emits at 185 nm, then the phosphor should be doped with Pr activator ions.

Ce acts as a sensitizer for 254 nm incident radiation. Therefore, if the luminescent material is exposed to 254 nm radiation, the Ce ions on the Sr lattice sites absorb the incident radiation and transfer the energy generated by the incident radiation to the $Mn^{2+}$ activator ions on the Al sites. Therefore, if $SrAl_{12}O_{19}$:$Mn^{2+}$ is used as a green emitting phosphor for a UV gas discharge lamp that emits at 254 nm, then the phosphor should be doped with Ce activator ions. If the $SrAl_{12}O_{19}$:$Mn^{2+}$ is used as a green emitting phosphor for a lamp or another radiation source that emits at both 185 nm and 254 nm, then both Ce and Pr sensitizers should be used. It should be noted that Pr and Ce act as sensitizers for ranges of different wavelengths extending to about 300 nm, and riot just for 185 and 254 nm wavelengths.

The current inventors believe the following possible mechanism of energy transfer utilizing Gd ions. The Gd ions reside on adjacent Sr sites in the magnetoplumbite $SrAl_{12}O_{19}$ lattice to form a Gd ion sublattice. The Pr or Ce sensitizers absorb the incident radiation and transfer the energy to at least one Gd ion in the sublattice. The Gd ions then transfer the energy to other Gd ions in the sublattice, until the energy reaches a Gd ion adjacent to a $Mn^{2+}$ activator. The energy is then transferred from the sublattice to the activator. Thus, the Gd ion sublattice facilitates energy transfer to the activator ions. Therefore, Gd may be added to $SrAl_{12}O_{19}:Mn^{2+}$ in addition to Pr and/or Ce.

Tb acts as a quantum efficiency enhancer in $SrAl_{12}O_{19}:Mn^{2+}$. The present inventors discovered that when $SrAl_{12}O_{19}:Mn^{2+}$ is doped with Tb ions, the green $Mn^{2+}$ quantum efficiency is improved compared to $SrAl_{12}O_{19}:Mn^{2+}$ that is not doped with Tb ions. Therefore, $SrAl_{12}O_{19}:Mn^{2+}$ may be doped with Tb ions in addition to being doped with Pr, Ce and/or Gd ions. The current inventors believe that a complex, multistage energy transfer probably occurs when $SrAl_{12}O_{19}:Mn^{2+}$ is doped with Tb ions as well as other trivalent rare earth ions to achieve an improved quantum efficiency. The current inventors determined that the green light is emitted mainly from the $Mn^{2+}$ ions, and not from the $Ce^{3+}$ or $Tb^{3+}$ ions in $SrAl_{12}O_{19}:Mn^{2+}$, $Tb^{3+}$, $Ce^{3+}$.

For at least the reasons described above, the $SrAl_{12}O_{19}:Mn^{2+}$ material may comprise any combination of one, two, three or four trivalent rare earth ion dopant species, depending on the required use of the material. Preferably, the dopant species comprise Pr, Ce, Gd and Tb.

Furthermore, a portion of the Al ions may be replaced by gallium, boron or magnesium ion dopant species. A preferred dopant species that substitutes the Al ions are the Mg ions. Mg ions act as charge compensating ions when the $Sr^{2+}$ lattice sites are filled by trivalent rare earth ions. A portion of the Sr ions may also be replaced by calcium or barium ion dopant species, if desired.

Therefore, the luminescent material according to an exemplary embodiment of the present invention may be characterized by the following generic formula: $AD_{12}O_{19}:Mn,R$, where A comprises at least one of strontium, calcium and barium, D comprises at least one of aluminum, gallium, boron and magnesium and R comprises at least one trivalent rare earth ion. Mn comprises an activator ion with a 2+ valence state.

Mn ion concentration may range from greater than zero to 50 mole or atomic percent or less of 1/12 of the D cationic species. The preferred Mn ion concentration range is 20 to 30 atomic percent and the preferred Mn ion concentration is 25 atomic percent of 1/12 of the D cationic species. In other words, there may be 0–0.5 moles or ions of Mn out of a total 12 moles or ions of the D cationic species. The remaining 11.5 to 12 moles of the D cationic species may comprise Al or a combination of Al and Mg.

The magnesium ion concentration may range from zero to 50 mole or atomic percent of 1/12 of the total Al ion concentration. The preferred Mg ion concentration range is 20 to 30 atomic percent and the preferred Mg ion concentration is 25 atomic percent of 1/12 of the Al cationic species. In other words, there may be 0–0.5 moles or ions of Mg out of a total 12 moles or ions of the D cationic species.

R ion concentration may range from greater than zero to 100 mole or atomic percent of the A cationic species (i.e., the strontium cationic species, which may be partially substituted by calcium or barium cationic species, if desired). The preferred R ion concentration range is 25 to 75 atomic percent and the preferred R ion concentration is 50 atomic percent of the A cationic species.

The concentrations of Mn and R ions may be expressed by the following formula:

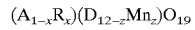

where $0<x\leq1$; $0<z\leq0.5$. In one preferred material of the present invention, A comprises strontium, D comprises at least one of aluminum and magnesium and R comprises at least one of cerium, praseodymium, gadolinium and terbium.

Cerium and praseodymium ion concentration may range from zero to 100 mole or atomic percent each of the total Sr ion concentration. It should be understood that any combination of Ce and Pr ion concentrations cannot exceed 100 mole or atomic percent of the Sr ion concentration. The preferred Ce and Pr ion concentration range is 10 to 40 atomic percent each of the Sr cationic species. If Ce ions are added without adding Pr ions, then the preferred Ce ion concentration is 30 atomic percent of the Sr cationic species. If Pr ions are added without adding Ce ions, then the preferred Pr ion concentration is 30 atomic percent of the Sr cationic species. If both Ce and Pr ions are added, then preferred Ce and Pr ion concentration is 15 atomic percent each of the Sr cationic species.

Gd and Tb ion concentration may range from zero to 50 mole or atomic percent each of the total Sr ion concentration. The preferred Gd and Tb ion concentration range is 5 to 15 atomic percent each and the preferred Gd and Tb ion concentration is 10 atomic percent each of the Sr cationic species.

The concentrations of Mg, Ce, Pr, Gd and Tb ions in the preferred material of the present invention may be expressed by the following formula: $(Sr_{1-m-q-r-t}Ce_mPr_qGd_rTb_t)(Al_{12-e-g}Mg_eMn_g)O_{19}$ where $0\leq m\leq1$; $0\leq q\leq1$; $0\leq r\leq0.5$; $0\leq t\leq0.5$; $0\leq e\leq0.5$; and $0<g\leq0.5$. One preferred material of the present invention contains non-zero concentrations of Mg, Ce, Pr, Gd and Tb ions. Another preferred material of the present invention contains non-zero concentrations of at least one of Ce and Pr ions. Another preferred material of the present invention contains non-zero concentrations of Ce and at least one of Gd and Tb ions. Yet another preferred material of the present invention contains non-zero concentrations of Pr and at least one of Gd and Tb ions. Three specific preferred materials of the present invention are:

1) $(Sr_{0.5}Ce_{0.3}Gd_{0.1}Tb_{0.1})(Al_{11.5}Mg_{0.25}Mn_{0.25})O_{19}$,
2) $(Sr_{0.5}Ce_{0.15}Pr_{0.15}Gd_{0.1}Tb_{0.1})(Al_{11.5}Mg_{0.25}Mn_{0.25})O_{19}$, and
3) $(Sr_{0.5}Ce_{0.15}Pr_{0.15}Gd_{0.1}Tb_{0.1})(Al_{11.75}Mn_{0.25})O_{19}$.

The luminescent material described above may be used in many different applications. For example, the material may be used as a phosphor in lamp, in a cathode ray tube, in a plasma display device or in a liquid crystal display. The material may also be used as a scintillator in an electromagnetic calorimeter, in a gamma ray camera, in a computed tomography scanner or in a laser. These uses are meant to be merely exemplary and not exhaustive.

Figure 2:
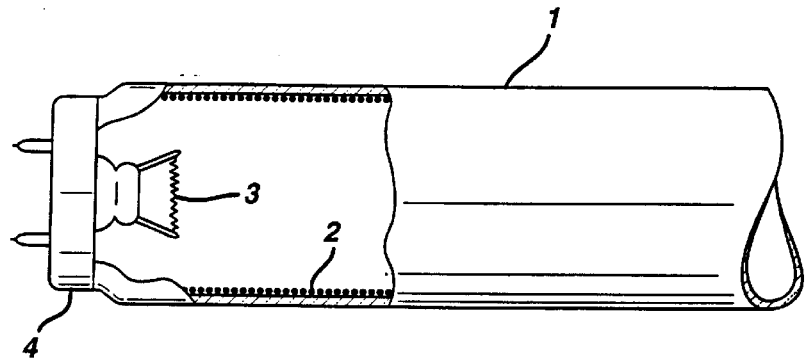
FIG. 2 is side cross sectional view of a fluorescent lamp coated with a phosphor in accordance with an exemplary embodiment of the present invention.

The $AD_{12}O_{19}:Mn,R$ phosphor may be used in a lamp. For example, the phosphor may be used in a linear fluorescent lamp, as shown, for example in FIG. 2. A fluorescent lamp comprises a bulb 1 filled with a gas, the phosphor 2 formed on the interior surface of the bulb 1, plural cathodes or gas discharge electrodes 3 and a lamp cap or base 4. Alternatively, the phosphor 2 may be coated on the outside surface of the bulb 1, or on a separate envelope containing the gas. The bulb 1 is preferably made of glass. Other appropriate transparent materials may also be used. The gas, such a mercury, emits radiation (i.e. ultraviolet radiation) when a potential is applied to the cathode 3 through the base 4. The phosphor 2 absorbs the incident UV radiation from the gas and emits green light.

Figure 3:
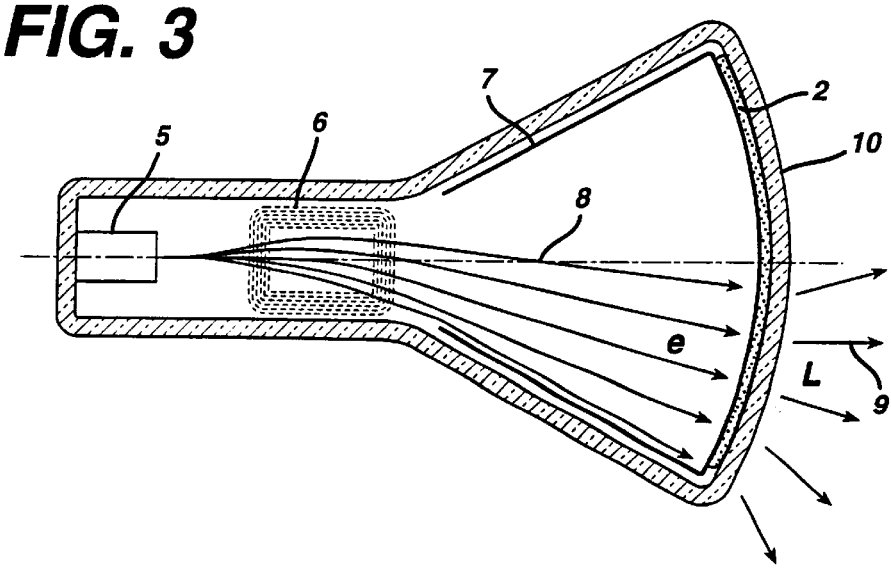
FIGS. 3 and 4 are side cross sectional view of cathode ray tubes coated with a phosphor in accordance with an exemplary embodiment of the present invention.
Figure 4:
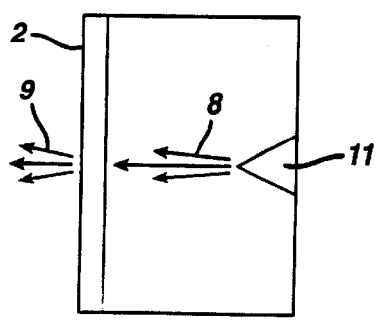

The $AD_{12}O_{19}:Mn,R$ phosphor may be used in a cathode ray tube (CRT). For example, the phosphor may be used in a CRT adapted for use in a television set, as shown, for example in FIG. 3. The CRT contains at least one, and preferably three electron gun(s) 5, at least one electron beam deflector 6, an anode 7, a display screen 10 and the phosphor 2 coated on the inside of screen. The CRT operates by emitting an electron beam 8 from the gun 5. The beam 8 is attracted to the phosphor 2 by the anode 7. The deflectors 6 control the position of the beam 8 on the phosphor 2. The portion of the phosphor 2 that absorbs the incident electron beam 8 emits green light 9 through the screen 10. Alternatively, the CPT may comprise a cathode array as shown, for example in FIG. 4. The CRT comprises an array of Spindt cathodes 11 (only one cathode is shown for clarity). When a control circuit (not shown) applies a potential to a particular cathode 11, it emits an electron beam 8 toward the phosphor 2. The phosphor 2 coverts the electron beam 8 into an emission of green light 9.

Figure 5:
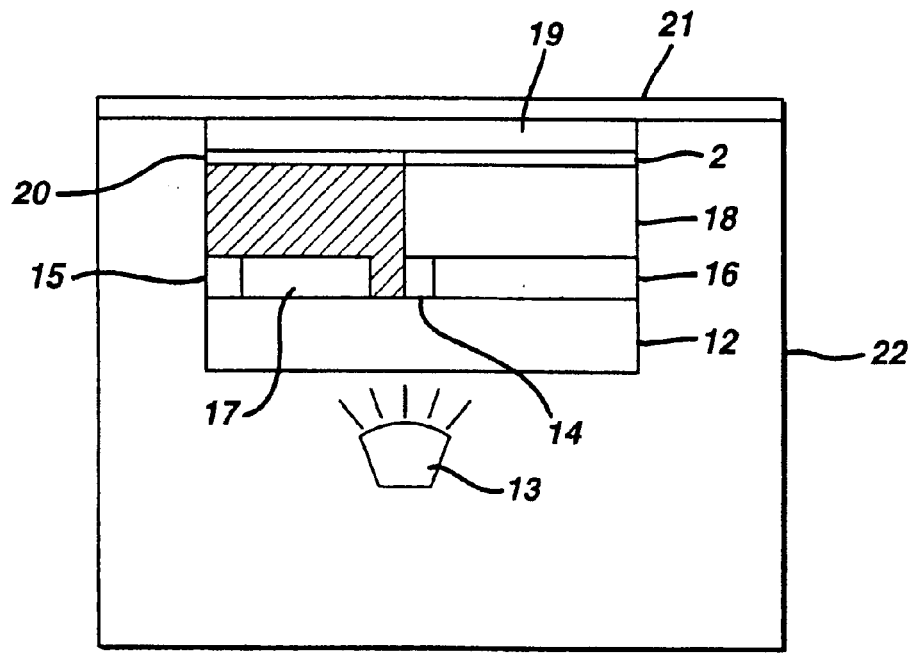
FIG. 5 is a side cross sectional view of a liquid crystal display device coated with a phosphor in accordance with an exemplary embodiment of the present invention.

The $AD_{12}O_{19}$:Mn,R phosphor may be used in a liquid crystal display (LCD), such as the one shown, for example, in FIG. 5. The LCD comprises a transparent substrate 12, a light source 13, an array of plural control transistors 14, 15, such as thin film transistors (only two are shown for clarity), a transparent electrode 16, 17 in electrical contact with each transistor, liquid crystal material 18, a transparent counter substrate 19, the green emitting $AD_{12}O_{19}$:Mn,R phosphor 2 formed on the counter substrate 19 above electrode 16, another phosphor 20 formed on the counter substrate 19 above electrode 17, a transparent display screen 21, and an opaque housing 22. When transistor 14 is switched on, the electrode 16 applies a potential to the liquid crystal material 18 directly above the electrode 16. The applied potential forces the liquid crystal material 18 to become transparent above electrode 16. The liquid crystal material remains opaque above electrode 17 if no potential is applied to electrode 17 from transistor 15. The light from lamp 13 may now pass through the transparent portion of the liquid crystal material 18 to reach the phosphor 2. Phosphor 2 absorbs the light from lamp 13 and emits green light through screen 21. An image may be formed on the screen 21 by controlling the transmission of light from lamp 13 to various colored phosphors 2, 20 through the liquid crystal material. The phosphor 2 may alternatively be formed above counter substrate 19 or on the inside surface of screen 21.

Figure 6:
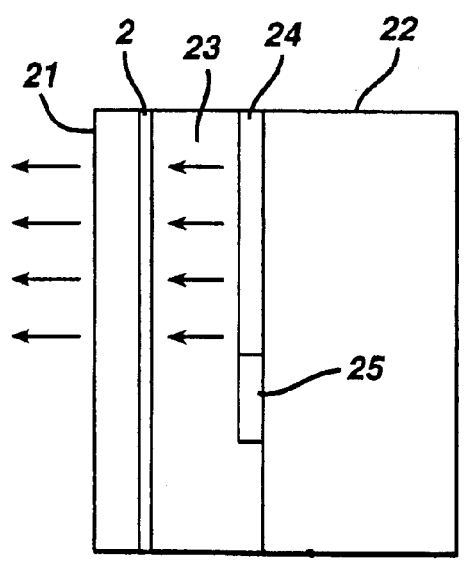
FIG. 6 is a side cross sectional view of a plasma display device coated with a phosphor in accordance with an exemplary embodiment of the present invention.

The $AD_{12}O_{19}$:Mn,R phosphor may be used in a plasma display device, such as the one as shown, for example, in FIG. 6. The plasma display device comprises a transparent display screen 21, an opaque housing 22, a gas envelope 23, an array of gas discharge electrodes 24 (only one electrode is shown for clarity) and a control device 25, such as a transistor. The phosphor 2 may be formed on the interior or exterior surface of the gas envelope 23 or on the interior surface of the screen 21. When the control device 25 applies a potential to electrode 24, the electrode 24 creates a localized plasma discharge in the gas contained in the envelope 23. The localized plasma emits UV radiation that is absorbed by an adjacent portion the phosphor 2. The irradiated portion of the phosphor 2 then emits green light through the screen 21. An image may be formed on the screen 21 by controlling the application of the potential to different electrodes 24 of the electrode array.

Figure 7:
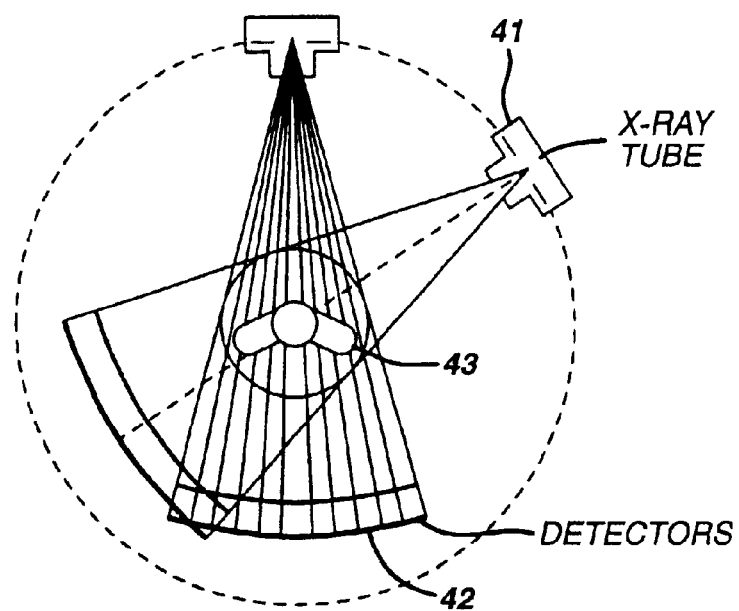
FIG. 7 is a side cross sectional view of an X-ray detection device containing a scintillator in accordance with an exemplary embodiment of the present invention.

The scintillator of the present invention may be used in a computed tomography (CT) scanning system, as shown for example in FIG. 7. The CT scanning system is used to obtain cross sectional images of the human body. In a CT scanning system, an X-ray source, such as an X-ray tube 41 rotates in a circle about the patient 43. An X-ray detector 42 is placed on the opposite side of the patient 43. The detector 42 rotates synchronously with the X-ray source about the perimeter of the circle. The detector comprises the $AD_{12}O_{19}$:Mn,R scintillator optically coupled to a photodiode or another type of photodetector. Alternatively, the detector 42 may comprise a $AD_{12}O_{19}$:Mn,R phosphor coated on a transparent substrate and optically coupled to a photodiode or another type of photodetector.

Figure 8:
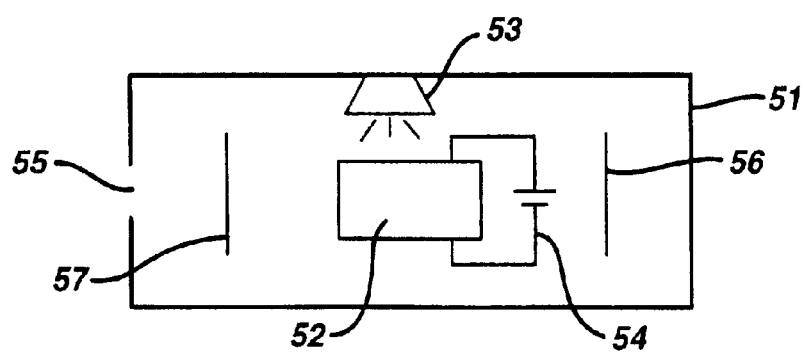
FIG. 8 a side cross sectional view of a laser containing a scintillator in accordance with an exemplary embodiment of the present invention.

Alternatively, the $AD_{12}O_{19}$:Mn,R scintillator may comprise a laser crystal, as shown for example in FIG. 8. The laser comprises a housing 51, the scintillator crystal 52 and a light source, such as a lamp 53. A potential can be applied to the crystal 52 through electrodes from a voltage source 54. The crystal 52 emits coherent green radiation through aperture 55 while the crystal is irradiated by the light source 53 or a potential is applied from the voltage source 54. The laser may optionally contain a full mirror 56 and a half mirror 57 for amplification of the coherent light amplitude by back and forth reflection of the light between the mirrors. Alternatively, the laser crystal 52 may be cleaved and/or processed to form a full mirror surface on the back of the crystal and a partial mirror surface on the front surface of the crystal 52 facing the aperture 55.

The $AD_{12}O_{19}$:Mn,R scintillator may also be used as a gamma ray camera or an electromagnetic calorimeter. In a gamma ray camera, the scintillator absorbs gamma rays and emits green light to expose a film. In an electromagnetic calorimeter, the scintillator absorbs high energy incident radiation, such as gamma rays collected by a telescope or positrons emitted by a positron source, and emits green light. Incident radiation from a distal radiation source enters the housing through an aperture in the housing. In these applications, this aperture may be considered as the source of incident radiation for the scintillator. Of course the $AD_{12}O_{19}$:Mn,R phosphor and scintillator may be used in applications other than those described above.

The $AD_{12}O_{19}$:Mn,R phosphor may be made by any ceramic powder method, such as a liquid phase (flux) method or a solid state method. Preferably, the method of making the phosphor comprises the following steps. First, compounds of the phosphor material are mixed in a crucible or another suitable container, such as a ball mill. For example, the starting materials may be blended using a ball mill with $ZrO_2$ or yttrium toughened zirconia milling media. The preferred starting phosphor compounds comprise oxides, carbonates, hydroxides, nitrates or oxalates of the metal constituents. For example, to form $(Sr_{1-m-q-r-t}Ce_mPr_qGd_rTb_t)(Al_{12-e-g}Mg_eMn_g)O_{19}$, strontium carbonate ($SrCO_3$), aluminum oxide (alumina, $Al_2O_3$) or aluminum hydroxide ($Al(OH)_3$), praseodymium oxide ($Pr_6O_{11}$), cerium oxide ($Ce_2O$), gadolinium oxide ($Gd_2O_3$), terbium oxide ($Tb_4O_7$), magnesium carbonate ($MgCO_3$) or magnesium oxide (MgO), and manganese oxide or carbonate ($MnCO_3$) may be mixed in the crucible or ball mill.

The blended materials are then fired in a reducing atmosphere for 5–15 hours at 1,400 to 1600° C., preferably for 10 hours at 1500° C. to sinter the material. The reducing atmosphere may comprise forming gas (2 percent hydrogen and 98 percent nitrogen). Preferably, the starting materials also contain a flux that promotes the reaction of the starting materials during the firing step to form the ceramic phosphor. Preferably, the flux comprises a halogen compound, such as a fluoride or a chloride compound. The preferred halogen compounds comprise magnesium, aluminum or strontium fluoride or magnesium, strontium, manganese or ammonium chloride. However, the phosphor may be fired without adding a flux. The fired mixture is then coated onto the substrate, such as a display screen or a lamp bulb.

Preferably, a suspension of the mixture particles and a liquid is used to coat the substrate.

Figure 9:
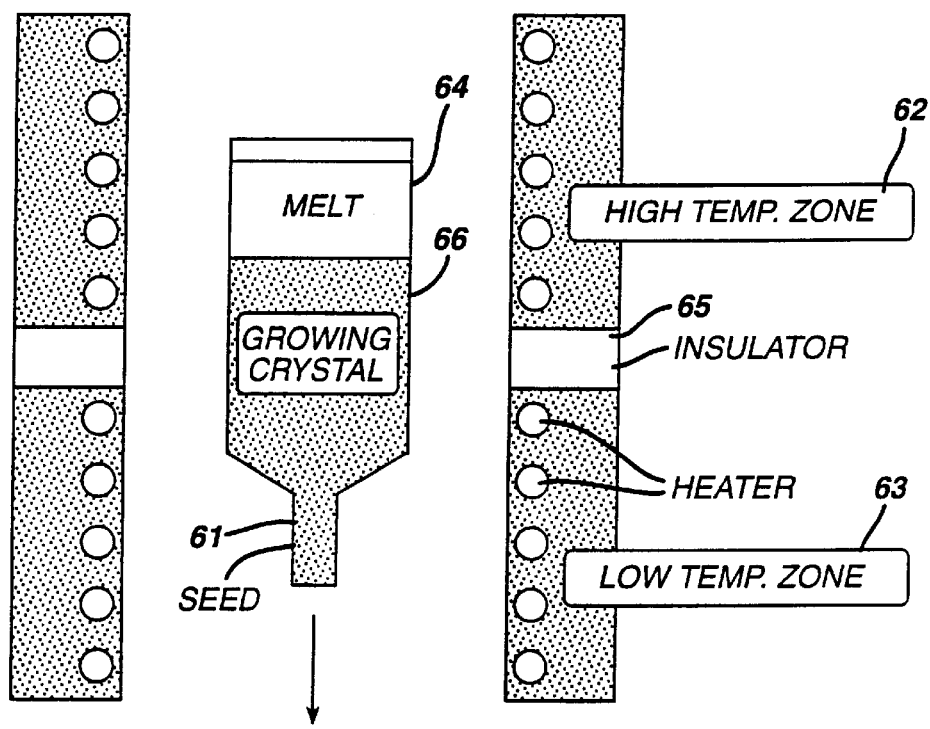
FIG. 9 is a schematic of one method of making a scintillator in accordance with an exemplary embodiment of the present invention.

The $AD_{12}O_{19}$:Mn,R scintillator may be made by any crystal growth method. Preferably, the scintillator is made by either the Bridgeman-Stockbarger method or the Czochralski method. A schematic of the Bridgeman-Stockbarger crystal growth method is shown in FIG. 9. A solid $AD_{12}O_{19}$:Mn,R material is placed in contact with a single crystal seed 61 in a housing or container. The seed 61 may comprise $AD_{12}O_{19}$:Mn,R or another material with a magnetoplumbite crystal structure. The solid material is then placed into a high temperature zone 62. The high temperature zone may comprise a resistance or lamp heater. The heater may have a bar or strip shape that melts only a portion of the solid material or it may be a furnace that melts the entire solid material to form a melt region 64. The seed 61 and the melt region 64 are then moved into a low temperature zone 63. If the high temperature zone 62 comprises a bar shaped heater, then the low temperature zone 63 comprises the area away from the heater. If the high temperature zone 62 comprises a furnace, then the low temperature zone 63 may be an area outside the furnace or a second furnace set to a lower temperature than the first furnace. The two furnaces are preferably separated by an insulating material 65. When the melt region 64 reaches the low temperature zone, it solidifies as a single crystal 66 that has the same lattice and orientation as the seed 61. The seed and the solid material may be moved relative to a stationary heater or furnace. Alternatively, the heater or furnace may be moved relative to a stationary seed 61. The relative movement may be vertical, horizontal or in any other direction.

Figure 10:
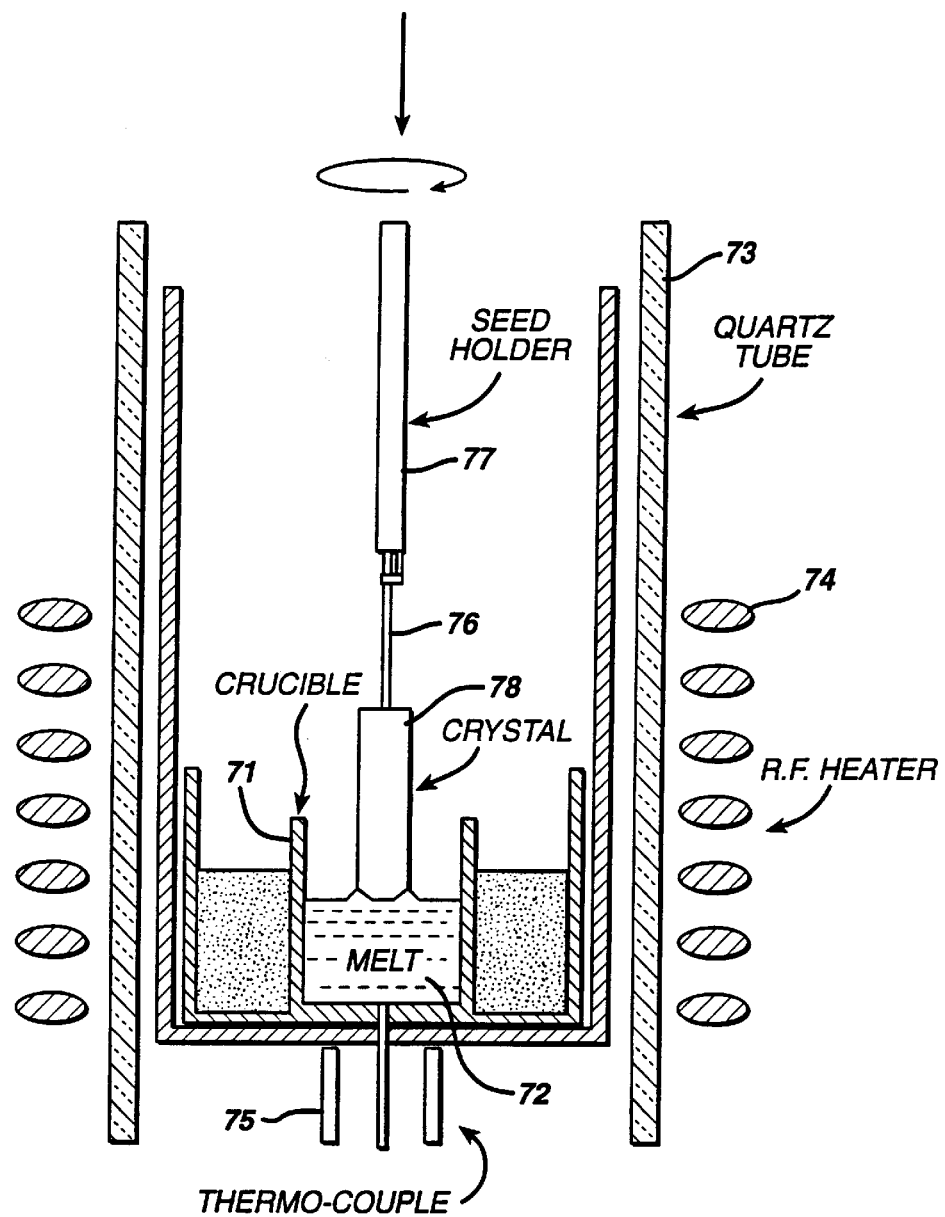
FIG. 10 is a schematic of another method of making a scintillator in accordance with an exemplary embodiment of the present invention.

A schematic of the Czochralski crystal growth method is shown in FIG. 10. The starting materials, comprising strontium, aluminum, oxygen, and at least one of magnesium, manganese, gallium, boron, barium, calcium, cerium, praseodymium, gadolinium and terbium are placed in a crucible 71 and heated to form a reactant melt 72. The crucible is located in a housing, such as a quartz tube 73, and heated by r.f. or resistance heaters 74. The melt temperature is determined by a thermocouple 75. A single crystal seed 76 attached to a seed holder 77 is lowered into the melt (the melt is the high temperature zone). As the seed 76 is rotated about its axis and lifted from the melt 72, a single crystal scintillator boule 78 forms below the seed. The size of the crystal boule 78 increases as the seed 76 is lifted further away from the melt 72 toward the low temperature zone above the heaters 74. The boule is then sliced and polished into scintillator crystals.

SPECIFIC EXAMPLE

A $(Sr_{0.5}Ce_{0.3}Gd_{0.1}Tb_{0.1})(Al_{11.5}Mg_{0.25}Mn_{0.25})O_{19}$ phosphor was made by the following method. Stoichiometric amounts of oxide and carbonate starting materials ($SrCO_3$, $Gd_2O_3$, $CeO_2$, $Tb_4O_7$, $Al_2O_3$, $MnCO_3$ and MgO) were well blended and fired at 1000° C. for five hours under a slightly reducing atmosphere (97% $N_2$ and 2% $H_2$ forming gas). The partially reacted material was reground after cooling to room temperature under the same reducing atmosphere. The reground material was reheated to 1550° C. under the same atmosphere. The resultant phosphor luminesced bright green under short wavelength UV excitation. Aluminum or magnesium fluoride fluxes may also be added to the starting materials to promote the reaction between the starting materials.

Figure 11:
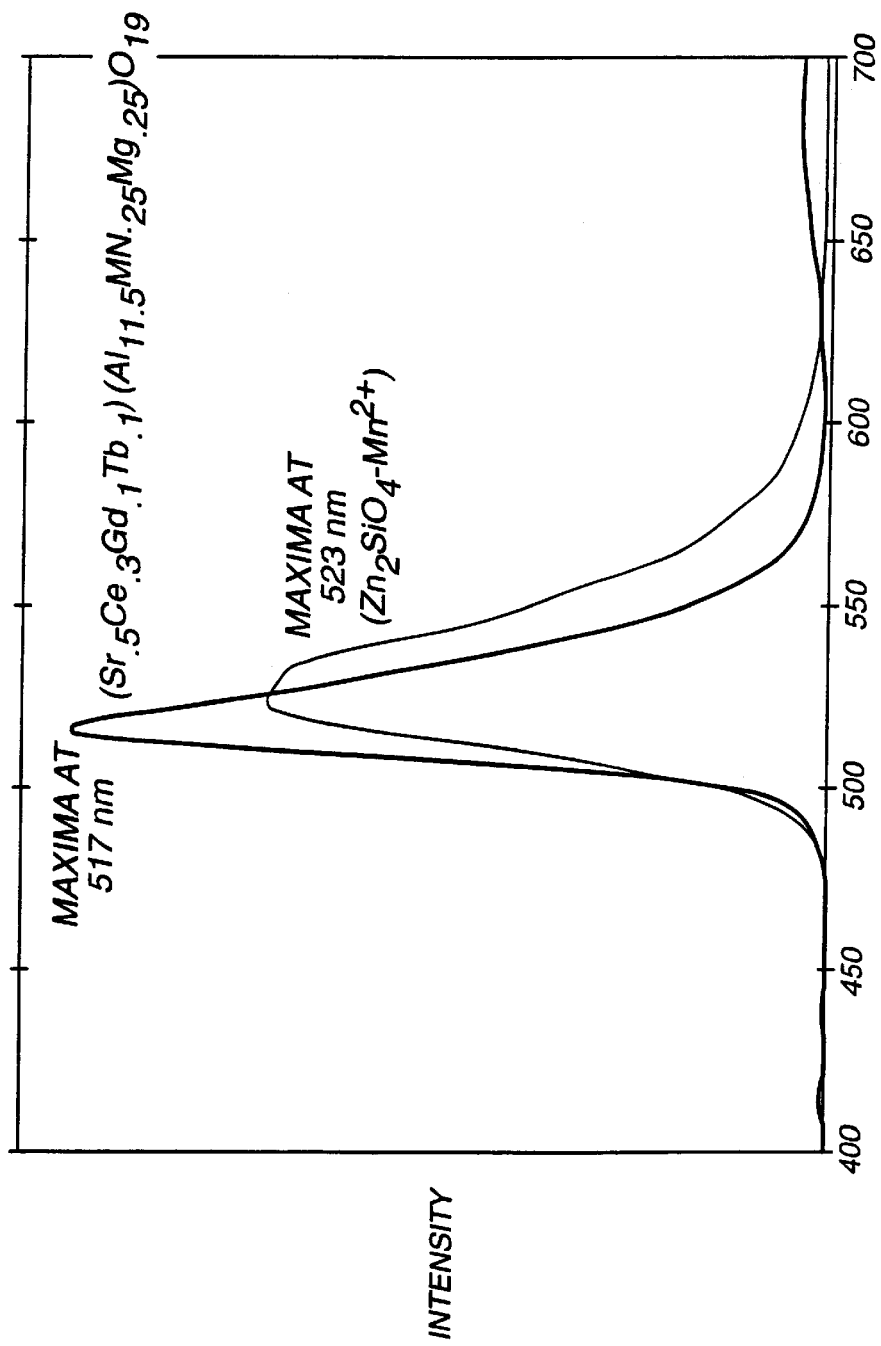
FIG. 11 is comparison of emission spectra of the phosphor in accordance with an exemplary embodiment of the present invention and of a prior art phosphor under 254 nm incident radiation.

The $(Sr_{0.5}Ce_{0.3}Gd_{0.1}Tb_{0.1})(Al_{11.5}Mg_{0.25}Mn_{0.25})O_{19}$ phosphor of the present invention and a $Zn_2SiO_4$:$Mn^{2+}$ prior art phosphor were irradiated with 254 nm incident radiation, and their emission spectra were measured with a spectrometer. The spectra are shown in FIG. 11. The $(Sr_{0.5}Ce_{0.3}Gd_{0.1}Tb_{0.1})(Al_{11.5}Mg_{0.25}Mn_{0.25})O_{19}$ phosphor exhibited a maximum emission wavelength of 517 nm. This wavelength in the green spectral range is only 6 nm away from the $Zn_2SiO_4$:$Mn^{2+}$ maximum emission wavelength of 523 nm.

Figure 12:
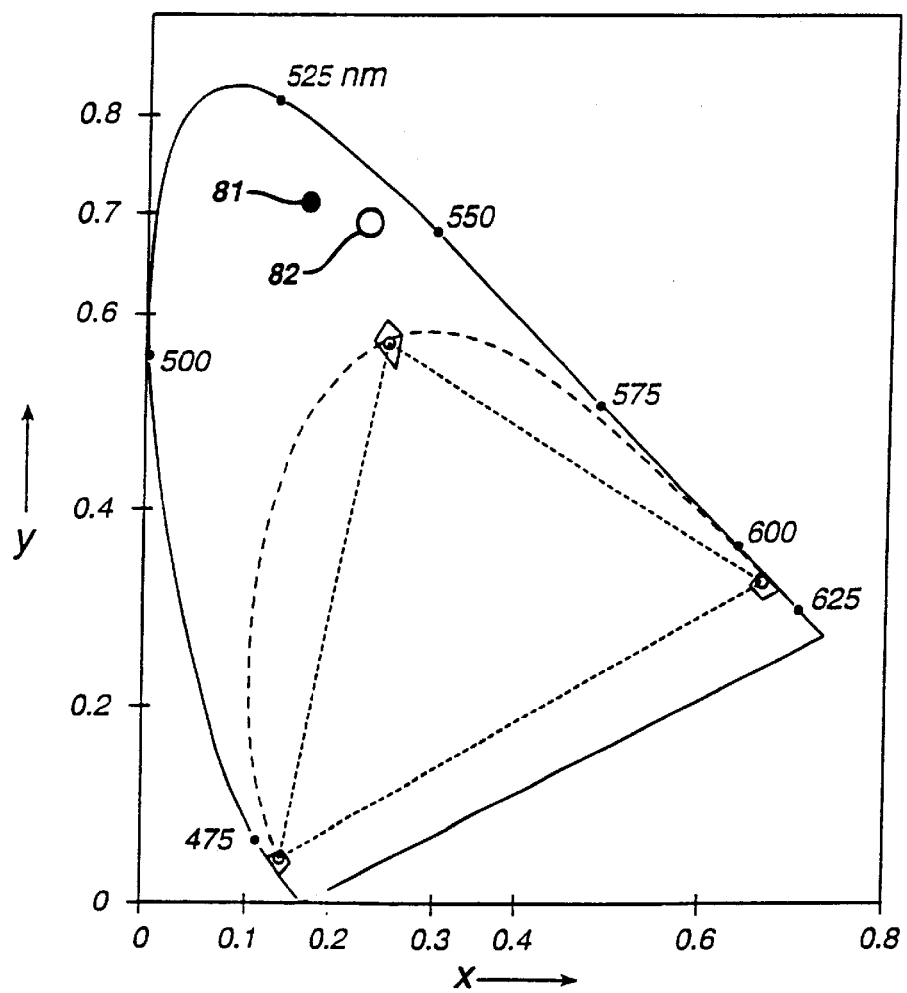
FIG. 12 is comparison of chromaticity color coordinates of the phosphor of an exemplary embodiment of the present invention and of a prior art phosphor.

The color coordinates of the $(Sr_{0.5}Ce_{0.3}Gd_{0.1}Tb_{0.1})(Al_{11.5}Mg_{0.25}Mn_{0.25})O_{19}$ phosphor and the $Zn_2SiO_4$:$Mn^{2+}$ prior art phosphor are described in the table below and are shown graphically on the CIE chromaticity diagram in FIG. 12.

TABLE

| PHOSPHOR | x | y |
| --- | --- | --- |
| $(Sr_{0.5}Ce_{0.3}Gd_{0.1}Tb_{0.1})(Al_{11.5}Mg_{0.25}Mn_{0.25})O_{19}$ | 0.173 | 0.736 |
| $Zn_2SiO_4$:$Mn^{2+}$ | 0.249 | 0.694 |

The chromaticity color coordinates x and y are known in the phosphor art, and are defined for example in a textbook by K. H. Butler, "Fluorescent Lamp Phosphors, Technology and Theory" (Penn. State U. Press 1980), pages 98–107. The solid curve in the diagram shows the monochromatic emission wavelength corresponding to certain x and y coordinates. As seen in FIG. 12, the $(Sr_{0.5}Ce_{0.3}Gd_{0.1}Tb_{0.1})(Al_{11.5}Mg_{0.25}Mn_{0.25})O_{19}$ phosphor (filled-in circle 81) which has a peak emission wavelength in the green range, has a more saturated green luminescence than the prior art $Zn_2SiO_4$:$Mn^{2+}$ phosphor (open circle 82) which has a peak emission wavelength in the green-yellow range. Furthermore, the two phosphors have an equivalent absolute quantum efficiency. Therefore, the $AD_{12}O_{19}$:Mn,R phosphor may replace the $Zn_2SiO_4$:$Mn^{2+}$ phosphor in virtually all applications. It should be understood that the example above is meant to merely illustrate the present invention and should not be deemed as limiting the scope of the claims.

While the invention has been described in detail and with reference to specific embodiments thereof, it will be apparent to one skilled in the art that various changes and modifications can be made therein without departing from the spirit and scope of the invention.

What is claimed is:

1. A luminescent device comprising:

a housing;

a source of energetic media contained in said housing; and a luminescent material contained in an interior of said housing, said luminescent material comprising:

$AD_{12}O_{19}$:Mn,R wherein A comprises at least one of strontium, barium, and calcium;

D comprises at least one of aluminum, boron, gallium, and magnesium; and

R comprises at least one trivalent rare earth ion other than cerium.

2. The device of claim 1, wherein Mn is $Mn^{2+}$.

3. The luminescent device of claim 1, wherein said luminescent material further comprises cerium and has a formula

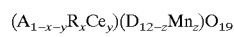

wherein A comprises at least one of strontium, barium, and calcium;

D comprises at least one of aluminum, boron, gallium, and magnesium;

R comprises at least one trivalent rare earth ion other than cerium; and $0<x<1, 0<y<1, 0<x+y<1$, and $0<z\leq 0.5$.

4. The device of claim 3, wherein:

the device is a lamp;

the housing comprises a transparent tube;

the energetic media comprises photons;

the source of energetic media comprises a gas in the transparent tube; and the luminescent material comprises a phosphor formed on an interior surface of the transparent tube.

5. The device of claim 4, further comprising a lamp base and at least one gas discharge electrode.

6. The device of claim 3 wherein:

the device is a plasma display;

the housing comprises a display screen;

the energetic media comprises photons;

the source of energetic media comprises a gas contained inside the housing; and the luminescent material comprises a phosphor formed on an interior surface of the display screen.

7. The device of claim 6, further comprising a control circuit coupled to gas discharge electrodes to excite predetermined portions of the gas.

8. The device of claim 3, wherein:

the device is a liquid crystal display;

the housing comprises a display screen;

the energetic media comprises photons;

the source of energetic media comprises a lamp contained inside the housing; and the luminescent material comprises a phosphor formed on a portion of a first substrate.

9. The device of claim 8, further comprising:

a liquid crystal material comprising a first surface adjacent to the first substrate;

a second substrate adjacent to a second surface of the liquid crystal material; and thin film transistors and transparent electrodes on said second substrate.

10. The device of claim 3, wherein:

the device is a cathode ray tube;

the housing comprises a display screen;

the energetic media comprises electrons;

the source of energetic media comprises at least one electron gun or cathode contained inside the housing; and the luminescent material comprises a phosphor formed inside of the display screen.

11. The device of claim 10, further comprising:

an anode between the display screen and the electron gun; and at least one electron deflector between the anode and the electron gun.

12. The device of claim 3, wherein:

the device is a laser;

the housing contains an emission aperture;

the energetic media comprises photons;

the source of energetic media comprises an apparatus selected from the group consisting of a lamp and a secondary laser contained inside the housing; and the luminescent material comprises a single crystal scintillator formed inside the housing.

13. The device of claim 12, further comprising:

a reflecting mirror;

a partially reflecting mirror;

at least one electrode in contact with the single crystal scintillator.

14. The device of claim 3, wherein:

the device is selected from the group consisting of an electromagnetic calorimeter, a gamma ray camera, and a computed tomography scanner;

the energetic media comprises radiation selected from the group consisting of X-rays and gamma rays;

the source of energetic media is an entrance aperture in the housing that allows the radiation to pass through; and the luminescent material comprises a scintillator formed inside the housing.

15. The device of claim 3, wherein:

the device is selected from the group consisting of a gamma ray camera and a computed tomography scanner; and the device further comprises a radiation-sensitive element selected from the group consisting of a photodetector and a photo-sensitive film.

16. A luminescent device comprising:

a housing;

a source of energetic media contained in said housing; and a luminescent material contained in an interior of said housing, said luminescent material comprising:

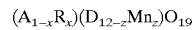

wherein A comprises at least one of strontium, barium, and calcium;

D comprises at least one of aluminum, boron, gallium, and magnesium; and

R comprises at least one trivalent rare earth ion other than cerium; and $0<x\leq 1$ and $0<z\leq 0.5$.

17. A luminescent device comprising:

a housing;

a source of energetic media contained in said housing; and a luminescent material contained in an interior of said housing, said luminescent material comprising:

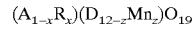

wherein A comprises strontium;

D comprises at least one of aluminum and magnesium; and

R comprises cerium and at least one of praseodymium, gadolinium, and terbium.

18. The device of claim 17, wherein said luminescent material comprises:

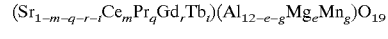

wherein $0<m\leq 1$; $0\leq q\leq 1$; $0\leq r \leq 0.5$; $0\leq t\leq 0.5$; $0\leq e\leq 0.5$; $0\leq g\leq 0.5$; and at least one of q, r, and t is greater than 0.

19. The device of claim 17, wherein:

A comprises strontium;

D comprises at least one of aluminum and magnesium; and R comprises a plurality of at least two trivalent rare earth ions, said plurality being selected from the group consisting of:

a) cerium, praseodymium, gadolinium, and terbium;
b) cerium and praseodymium;
c) cerium and at least one of gadolinium and terbium; and
d) praseodymium and at least one of gadolinium and terbium.

20. A luminescent device comprising:

a housing;

a source of energetic media contained in said housing; and a luminescent material contained in an interior of said housing, said luminescent material comprising:

$$(Sr_{0.5}Ce_{0.3}Gd_{0.1}Tb_{0.1})(Al_{11.5}Mg_{0.25}Mn_{0.25})O_{19}.$$

21. A luminescent device comprising:

a housing;

a source of energetic media contained in said housing; and a luminescent material contained in an interior of said housing, said luminescent material comprising:

$$(Sr_{0.5}Ce_{0.15}Pr_{0.15}Gd_{0.1}Tb_{0.1})(Al_{11.5}Mg_{0.25}Mn_{0.25})O_{19}.$$

22. A luminescent device comprising:

a housing;

a source of energetic media contained in said housing; and a luminescent material contained in an interior of said housing, said luminescent material comprising:

$$(Sr_{0.5}Ce_{0.3}Gd_{0.1}Tb_{0.1})(Al_{11.75}Mn_{0.25})O_{19}.$$

23. A luminescent device comprising:

a housing;

a source of energetic media contained in said housing; and a luminescent material contained in an interior of said housing, said luminescent material comprising:

$$AD_{12}O_{19}:Mn,R$$

wherein A comprises strontium and at least one other material selected from the group consisting of barium, and calcium;

D comprises at least one of aluminum, boron, gallium, and magnesium; and

R comprises at least one trivalent rare earth ion selected from the group consisting of cerium, praseodymium, gadolinium, and terbium.

24. The luminescent device of claim 23, wherein said luminescent material has a formula $$(Sr_{1-x-y}R_xQ_y)(D_{12-z}Mn_z)O_{19}$$

wherein Q comprises at least one of barium and calcium; and $0<x<1, 0<y<1, 0<x+y<1$, and $0<z\leq0.5$.

25. A luminescent device comprising:

a housing;

a source of energetic media contained in said housing; and a luminescent material contained in an interior of said housing, said luminescent material comprising:

$$AD_{12}O_{19}:Mn,R$$

wherein A comprises strontium;

D comprises eat least one material selected from the group consisting of boron, gallium, and magnesium; and R comprises at least one trivalent rare earth ion selected from the group consisting of cerium, praseodymium, gadolinium, and terbium.

26. The luminescent device of claim 25, wherein said luminescent material has a formula $$(Sr_{1-x}R_x)(D_{12-z}Mn_z)O_{19}$$

wherein $0<x<1$ and $0<z\leq0.5$.

27. A luminescent device comprising:

a housing;

a source of energetic media contained in said housing; and a luminescent: material contained in an interior of said housing, said luminescent material comprising:

$$AD_{12}O_{19}:Mn,R$$

wherein A comprises at least one material selected from the group consisting of barium and calcium;

D comprises at least one material selected from the group consisting of aluminum, boron, gallium, and magnesium; and R comprises at least one trivalent rare earth ion selected from the group consisting of cerium, praseodymium, gadolinium, and terbium.

28. The luminescent device of claim 27, wherein said luminescent material has a formula $$(A_{1-x})(D_{12-z}Mn_z)O_{19}$$

wherein $0<x<1$ and $0<z\leq0.5$.

* * * * *